United States Patent [19]

Bailey et al.

[11] Patent Number: 5,407,523
[45] Date of Patent: Apr. 18, 1995

[54] APPARATUS FOR ASSEMBLING LOST FOAM CASTING PATTERNS

[75] Inventors: Francis V. Bailey, Racine; Duane M. Scherbarth, Sussex; Robert Mooney, Oak Creek, all of Wis.

[73] Assignee: Outboard Marine Corporation, Waukegan, Ill.

[21] Appl. No.: 106,055

[22] Filed: Aug. 13, 1993

[51] Int. Cl.⁶ .......................... B05C 3/18; B32B 31/12
[52] U.S. Cl. ..................................... 156/556; 156/578; 118/421; 100/264; 100/290; 219/420
[58] Field of Search ............... 156/556, 578, 580, 540, 156/583.1; 118/400, 423, 421, 500, 503, 64; 100/264, 290; 414/773, 783; 219/420, 421

[56] References Cited

U.S. PATENT DOCUMENTS

| | | | |
|---|---|---|---|
| 360,952 | 4/1887 | Crowell | 118/421 X |
| 2,657,668 | 11/1953 | Maier | 118/421 X |
| 2,734,481 | 2/1956 | Johnson et al. | 118/421 |
| 3,056,371 | 10/1962 | Frank | 118/423 X |
| 3,121,646 | 2/1964 | Smart | 118/421 X |
| 3,976,028 | 8/1976 | Howells et al. | 118/421 X |
| 4,036,168 | 7/1977 | Laliberte et al. | 118/421 X |
| 4,353,775 | 10/1982 | Paul | 156/540 |
| 4,419,168 | 12/1983 | Paul | 156/351 |
| 4,549,923 | 10/1985 | Tachibana et al. | 118/421 X |
| 4,572,762 | 2/1986 | Winston | 156/556 |
| 4,744,853 | 5/1988 | Landua et al. | 156/390 |
| 4,883,558 | 11/1989 | Bellis et al. | 156/578 X |
| 4,895,101 | 1/1990 | Knorr | 118/423 X |
| 4,958,588 | 9/1990 | Hutchison et al. | 118/423 |
| 4,963,216 | 10/1990 | Watkins | 156/578 X |

Primary Examiner—Michael W. Ball
Assistant Examiner—Francis J. Lorin
Attorney, Agent, or Firm—Michael, Best & Friedrich

[57] ABSTRACT

An apparatus for gluing together first and second pieces of a foam pattern to be used in a lost foam casting process, the apparatus comprising a frame, a glue tank adapted to contain glue, a glue platen supported by the frame for vertical movement relative thereto, the glue platen being movable relative to the frame between a lower position submerged in the glue and an upper position raised above the glue, a center platen located above the glue platen to hold the first pattern piece, the center platen being supported by the frame for pivotal movement relative thereto about a generally horizontal axis, and a top platen for holding the second pattern piece located above the center platen, the top platen being supported by the frame for vertical movement relative thereto between upper and lower positions. While in one pivotable position, the foam piece held by the center platen faces downward and, in the other position, it faces upward. While in the first position, the center platen is movable vertically downward to apply glue to the surface of the first foam piece by contacting the glue platen which is in its upper position. Then, while in the second position, the center platen is movable vertically upward to glue the first foam piece to the second piece. The apparatus also provides a connector to selectively connect the glue platen to the glue tank to thereby selectively raise the tank allowing access to heating elements underneath.

20 Claims, 8 Drawing Sheets

APPARATUS FOR ASSEMBLING LOST FOAM CASTING PATTERNS

BACKGROUND OF THE INVENTION

The invention relates to the lost foam casting process, and more particularly to apparatus for assembling lost foam casting patterns.

A known apparatus for assembling lost foam casting patterns is disclosed in U.S. Pat, No. 4,572,762. A glue tank and a lower platen sit next to each other on the floor, and an upper platen moves between the glue tank and the lower platen. The upper platen supports an upper pattern piece, and the lower platen supports a lower pattern piece. Glue is applied to the upper pattern piece at the glue tank, after which the upper platen moves the upper pattern piece to a position above the lower pattern piece. The lower platen then moves upwardly to glue the upper and lower pattern pieces together.

SUMMARY OF THE INVENTION

The invention provides an improved apparatus for gluing together pieces of a lost foam casting pattern. The improved apparatus costs less and requires less floor space than conventional apparatus.

More particularly, the invention provides an apparatus comprising a glue tank and a frame supporting a glue platen for vertical movement relative to the glue tank. The glue platen supports a glue print plate having an upwardly facing glue applying surface. The glue platen is movable relative to the glue tank between a lower position wherein the glue applying surface is submerged in the glue in the tank, and an upper position wherein the glue applying surface is above the glue in the tank. Preferably, a linear actuator such as a hydraulic cylinder/piston assembly is supported by the frame and moves the glue platen between its upper and lower positions.

The apparatus also comprises a center platen above the glue platen. The center platen supports a bottom fixture which is in turn adapted to support a bottom pattern piece. The center platen is supported by the frame for pivotal movement relative thereto about a generally horizontal axis and between first and second rotary positions. In the preferred embodiment of the invention, the first and second rotary positions are 180° apart, and a hydraulic rotary actuator is supported by the frame and moves the center platen between its first and second rotary positions. When the center platen is in its first rotary position, the bottom pattern piece faces upwardly. When the center platen is in its second rotary position, the bottom pattern piece faces downwardly and the glue print plate applies glue to the bottom pattern piece when the glue platen moves from its lower position to its upper position.

The apparatus further comprises a top platen above the center platen. The top platen supports a top fixture which is in turn adapted to support a top pattern piece. The top platen is supported by the frame for vertical movement relative thereto between upper and lower positions. Preferably, a linear actuator, such as a ball screw arrangement, is supported by the frame and moves the top platen between its upper and lower positions. When the top platen is in its upper position and the center platen is in its first rotary position (such that the bottom pattern piece faces upwardly), the top pattern piece is spaced above the bottom pattern piece. When the center platen is then moved from its upper position to its lower position, the top pattern piece is moved into gluing contact with the bottom pattern piece.

Restricting the center platen to pivotal movement makes the apparatus easier to keep aligned, makes the controls and hardware less complicated and reduces the required floor space.

In the preferred embodiment of the invention, the top platen is also supported by the frame for pivotal movement relative thereto about a generally horizontal axis. This has two advantages. First, the top platen can be pivoted to facilitate location of the top pattern piece on the top fixture. Second, a second top fixture can be mounted on the opposite side of the top platen so that the second top fixture can be used simply by rotating the top platen 180°. This substantially reduces the amount of time needed to convert the apparatus from one set of fixtures to another.

Similarly, a second bottom fixture can be mounted on the opposite side of the center platen. If the center platen is also pivoted 180°, it is only necessary to change the glue print plate in order to prepare the apparatus for assembling different pattern pieces.

In another embodiment of the invention, the top platen is movable only vertically. In other words, each of the glue platen, the center platen and the top platen is constrained to one type of movement (pivotal movement about a single axis for the center platen, and vertical movement for the glue platen and the top platen). This makes the apparatus much easier and less expensive to manufacture.

Preferably, the apparatus further comprises a heating mechanism beneath the glue tank, and the glue tank can be selectively connected (such as by bolts or screws) to the glue platen such that movement of the glue platen from the lower position to the upper position causes upward movement of the glue tank to provide access to the heating mechanism. This substantially reduces the amount of time necessary to service the heating mechanism.

Other features and advantageous of the invention will become apparent to those skilled in the art upon review of the following detailed description, claims and drawings.

DESCRIPTION OF THE DRAWINGS

FIGS. 9 through 16 are vertical sectional views of the apparatus illustrating the operation thereof.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 10 for gluing together lost foam casting pattern pieces, which apparatus 10 embodies the invention, is illustrated in the drawings.

The apparatus 10 comprises a frame 14 which rests on the floor. The frame 14 includes four vertically extending posts 18 and a plurality of horizontal cross members 22 connecting adjacent posts 18.

Figure 7:
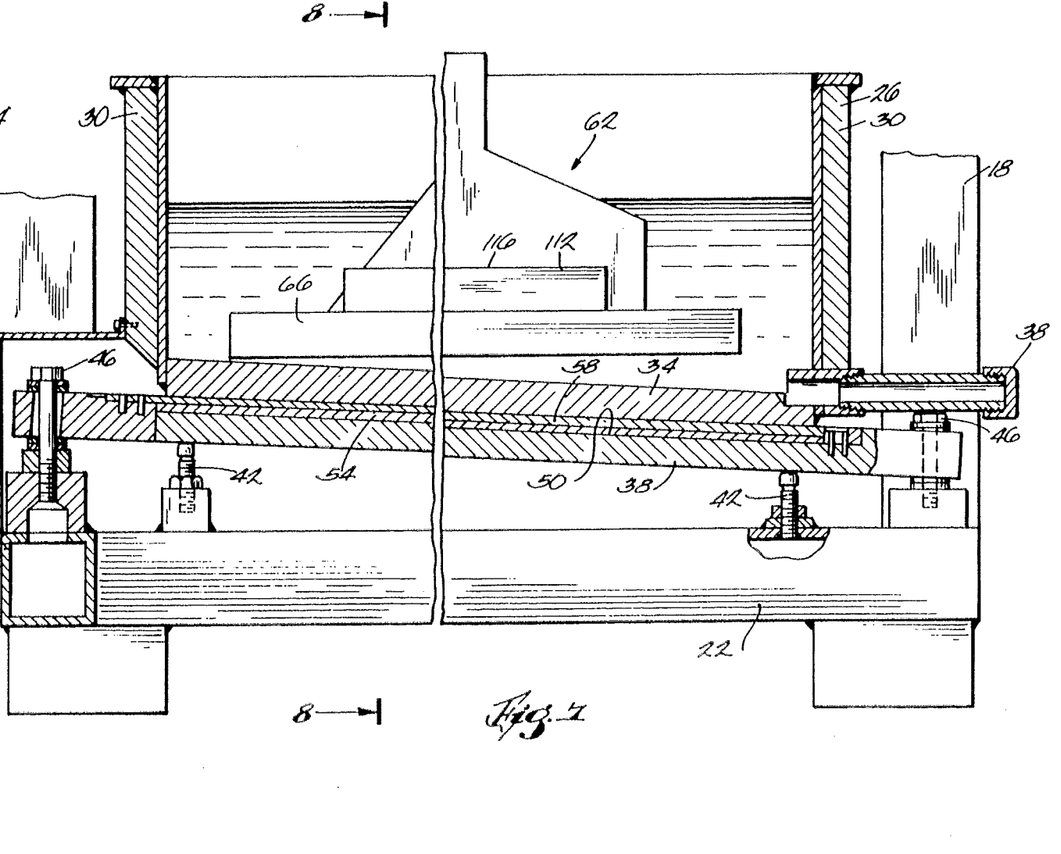
FIG. 7 is a vertical sectional view of the lower portion of the apparatus.
Figure 8:
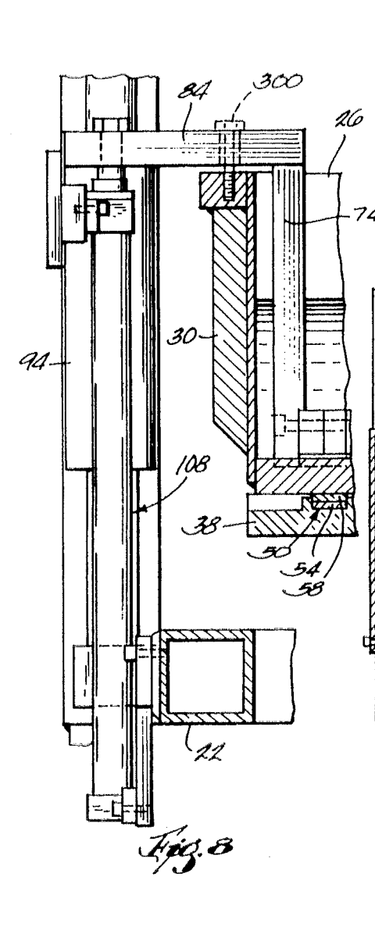
FIG. 8 is a view taken along line 8—8 in FIG. 7.

The apparatus 10 also comprises (see FIGS. 1, 7 and 8) a glue tank 26 containing glue. While the glue tank 26 is preferably supported by the frame 14, the glue tank 26 could also rest on the floor. The glue tank 26 is generally rectangular and has vertical side walls 30 and a bottom wall 34 that slopes downwardly from front to back, as best shown in FIG. 7. A drain 38 is provided at the rear of the glue tank 26. The bottom wall 34 of the glue tank 26 rests on a plate 38 that is fixed to the frame 14. More particularly, the plate 38 rests on the upper ends of supporting members 42 threaded into frame cross members 22. The supporting members 42 are adjustable so that the angle of the plate 38 is adjustable. The plate 38 is fixed relative to the frame 14 by bolts or screws 46 that extend through the plate 38 and are threaded into frame cross members 22. The upper surface of the plate 38 has therein (see FIGS. 7 and 8) a plurality of parallel, elongated recesses 50 extending from front to back. Each of the recesses 50 has therein a strip of insulating material 54 and a heating element 58 on top of the insulating material 54. The bottom wall 34 of the glue tank 26 rests on the heating elements 58 so that the heating elements heat the glue tank 26 and the glue therein.

The apparatus 10 also comprises a glue platen 62 supported by the frame 14 for vertical movement relative thereto. As best shown in FIGS. 1, 2, 7 and 8, the glue platen 62 includes a generally horizontal lower portion 66, a vertical portion 70 extending upwardly from one side of the lower portion 66, and a vertical portion 74 extending upwardly from the other side of the lower portion 66. A horizontal portion 80 extends outwardly from the upper end of the vertical portion 70, and a horizontal portion 84 extends outwardly from the upper end of the vertical portion 74. A bearing sleeve or bushing 90 extends downwardly from the horizontal portion 80, and a bearing sleeve or bushing 94 extends downwardly from the horizontal portion 84. The bushing 90 slides along a vertical guide bar or bearing rod 100 extending between two cross members 22, and the bushing 94 slides along a vertical guide bar or bearing rod 104 extending between two cross members 22. The guide bars 100 and 104 guide movement of the glue platen 62 between an upper position (shown in FIG. 12) and a lower position (shown in FIGS. 7 and 8).

A pair of linear actuators 108 move the glue platen 62 between its upper and lower positions. Each linear actuator 108 is preferably a hydraulic assembly that extends vertically and has a lower end fixed to a frame cross member 22 and an upper end fixed to a respective one of the glue platen horizontal portions 80 and 84. Extension of the assemblies 108 moves the glue platen 62 to its upper position and contraction of the assemblies 108 moves the glue platen 62 to its lower position.

The lower portion 66 of the glue platen 62 supports a glue print plate 112 having an upwardly facing glue applying surface 116. The glue applying surface 116 is submerged in the glue when the glue platen 62 is in its lower position, and the glue applying surface 116 is above the glue when the glue platen 62 is in its upper position.

Figure 1:
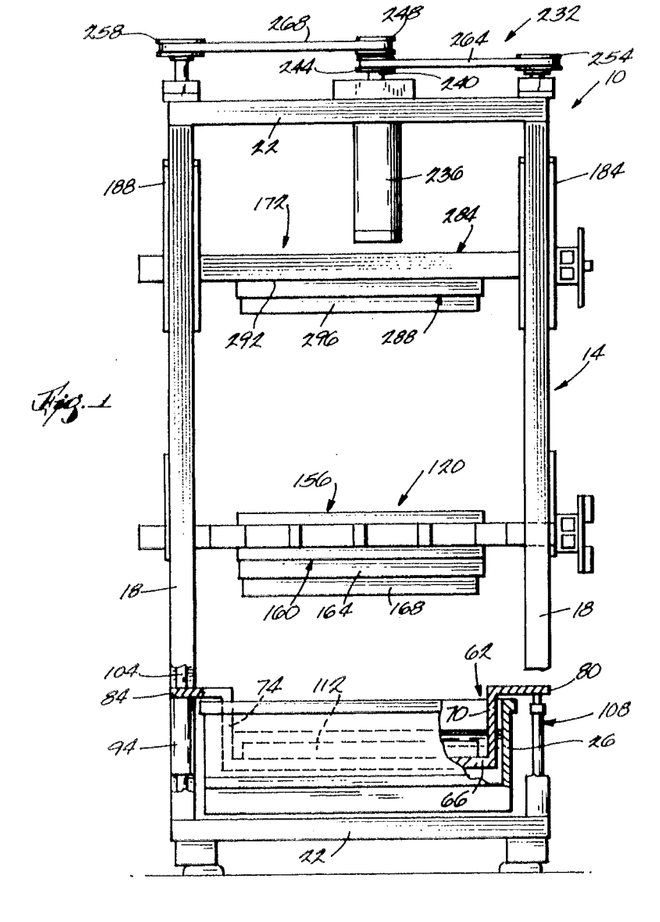
FIG. 1 is a front elevational view, partially broken away, of an apparatus embodying the invention.
Figure 5:
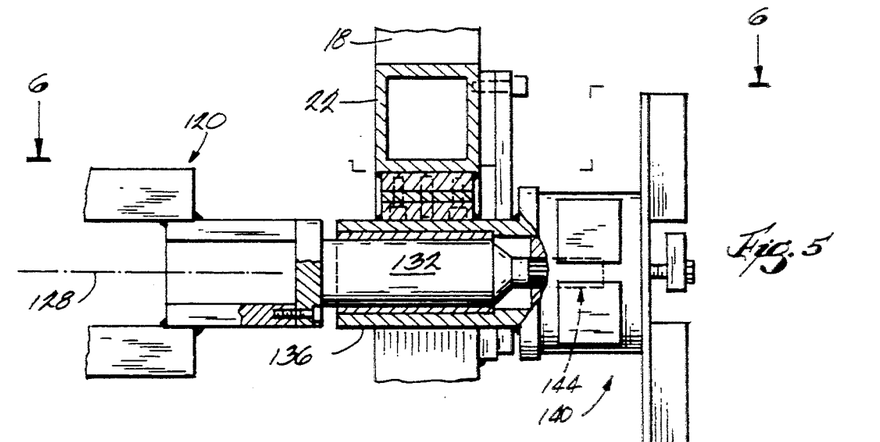
FIG. 5 is a view taken along line 5—5 in FIG. 2.
Figure 6:
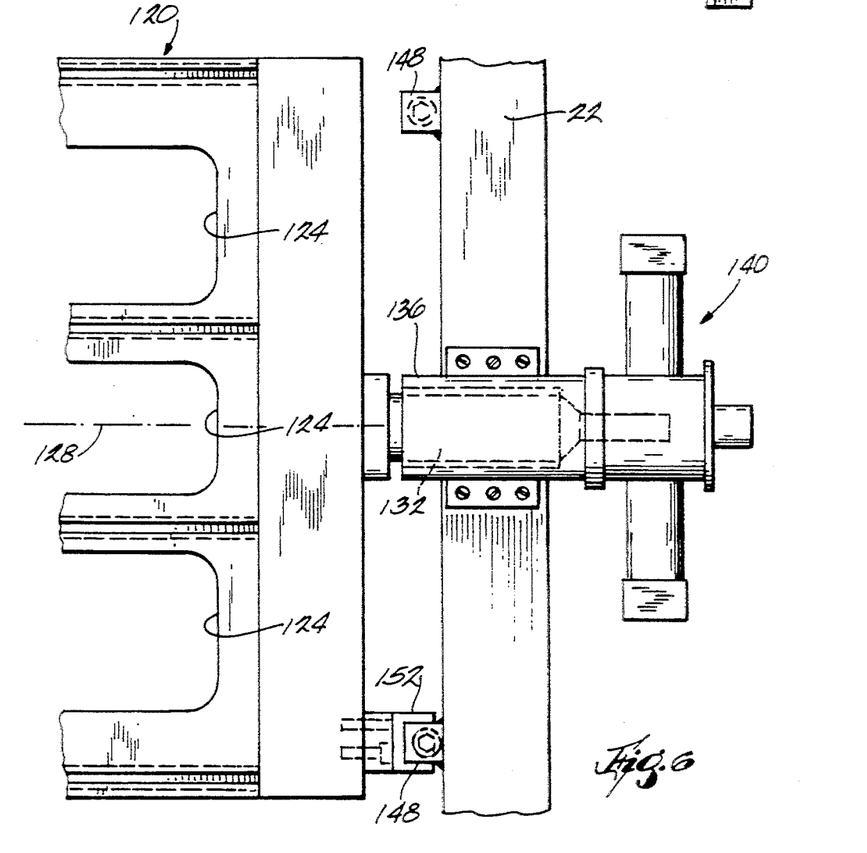
FIG. 6 is a view taken along line 6—6 in FIG. 5.

The apparatus 10 also comprises a center platen 120 located above the glue platen 62. The center platen 120 is rectangular and has therethrough a plurality of generally rectangular openings 124, as partially shown in FIG. 6. The center platen 120 is supported by the frame 14 for pivotal movement relative thereto about a generally horizontal axis 128 and between a first rotary position (shown in FIG. 9) and a second rotary position (shown in FIG. 11). More particularly, each of the right and left ends of the center platen 120 (as seen in FIG. 1) has extending outwardly therefrom (see FIGS. 5 and 6) a trunnion 132 centered on the axis. Only the trunnion 132 on the right end of the platen 120 is shown in the drawings. Each of the trunnions 132 is housed in a bearing sleeve 136 supported by a frame cross member 22.

The center platen 120 is pivoted relative to the frame 14 by a rotary actuator 140 mounted on the frame 14. The rotary actuator 140 is preferably a hydraulic actuator drivingly connected to the right trunnion 132 (see FIG. 5) by a spline arrangement 144. Pivotal movement of the center platen 120 is limited by stops 148 (see FIG. 6) on one of the frame cross members 22. The stops 148 engage a projection 152 on the center platen 120. A pair of shock absorbers (not shown) mounted on the frame 14 engage and decelerate the center platen 120 as it approaches the stops 148.

The center platen 120 has opposed first and second sides 156 and 160 (upper and lower sides in FIG. 1) each adapted to support one or more bottom fixtures 164 which are in turn adapted to support respective first or bottom pattern pieces 168. In the illustrated construction, a single fixture 164 and a single pattern piece 168 are shown. The first side 156 of the center platen 120 faces upwardly when the center platen 120 is in its first rotary position, and the second side 160 of the center platen 120 faces upwardly when the center platen 120 is in its second rotary position. The pattern piece 168 can be secured to the fixture 164 in any suitable manner. In the preferred embodiment, as is known in the art, the pattern piece 168 is secured to the fixture 164 by a vacuum. Vacuum tubes (not shown) can be connected to the fixture 164 in any suitable manner. Preferably, the vacuum tubes run through the left trunnion 132 and the center platen 120 to the fixture 164.

The apparatus 10 also comprises a top platen 172 located above the center platen 120. The top platen 172 is, like the center platen 120, rectangular and has therethrough a plurality of generally rectangular openings (not shown). The top platen 172 is supported by the frame 14 for pivotal movement relative thereto about a generally horizontal axis 176 and between a first rotary position (shown in FIG. 10) and a second rotary position (not shown). The top platen 172 is also supported by the frame 14 for vertical movement relative thereto between an upper position (shown in FIG. 9) and a lower position (shown in FIG. 15).

Figure 2:
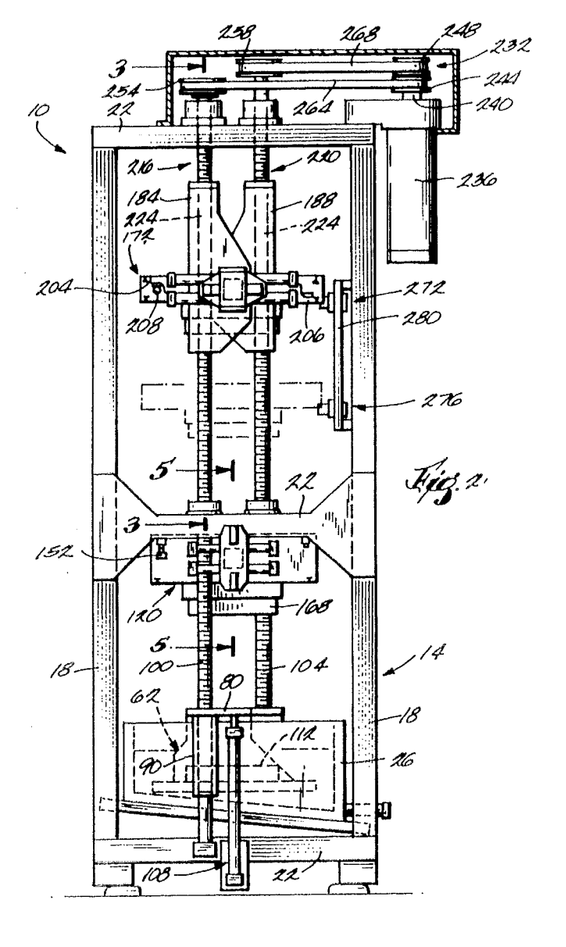
FIG. 2 is a right side elevational view of the apparatus.
Figure 3:
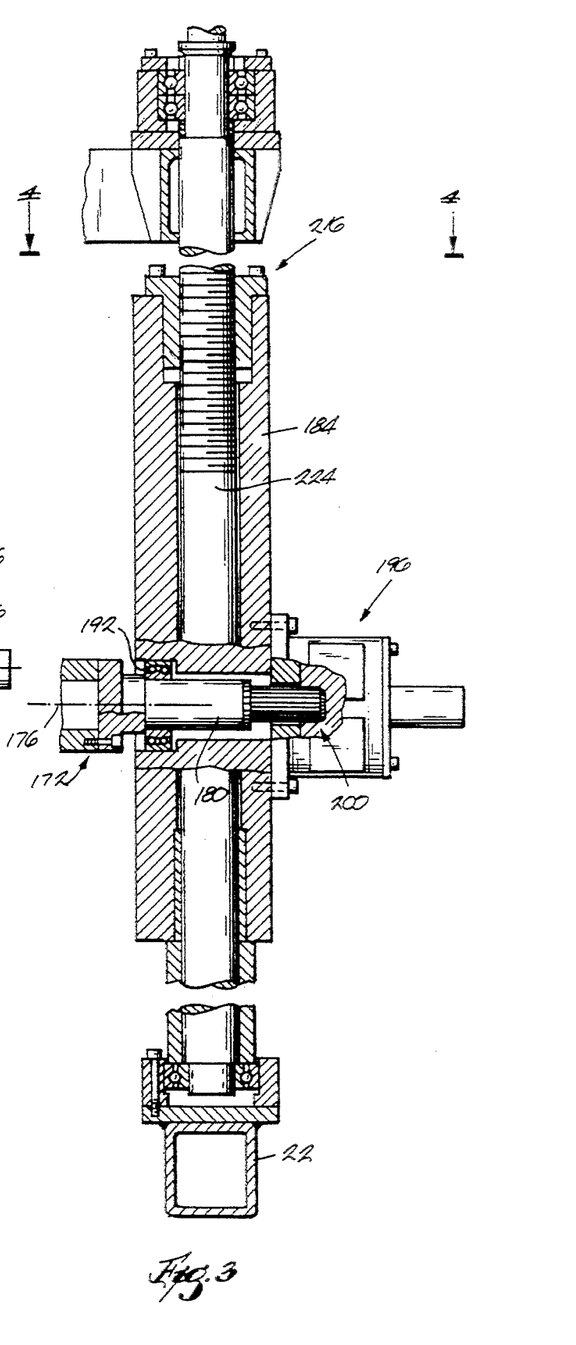
FIG. 3 is a view taken along line 3—3 in FIG. 2.
Figure 4:
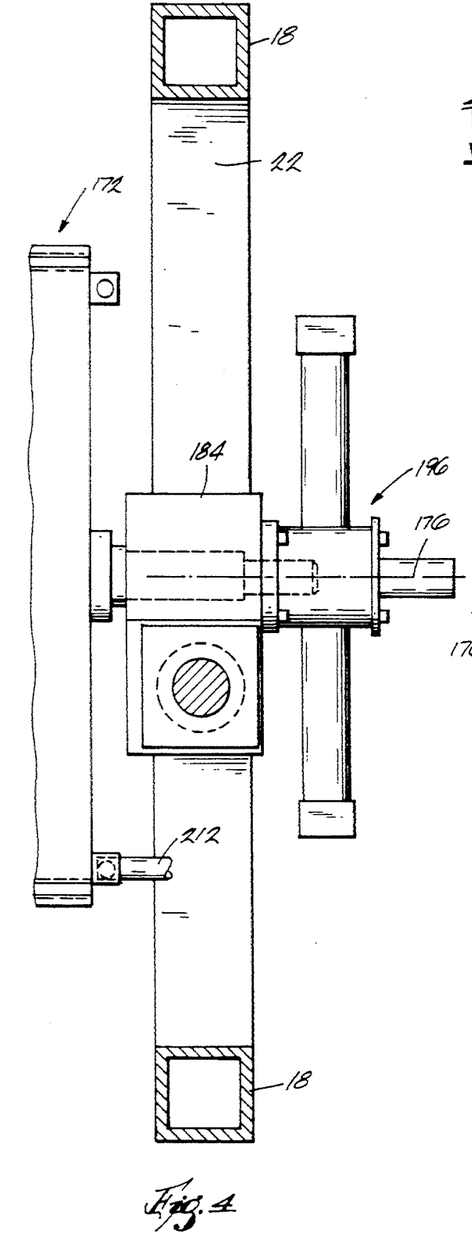
FIG. 4 is a view taken along line 4—4 in FIG. 3.

More particularly, each of the right and left ends of the top platen 172 (as seen in FIG. 1) has extending outwardly therefrom (see FIG. 3) a trunnion 180 centered on the axis 176. The right and left trunnions 180 are respectively supported by right and left bearing blocks 184 and 188 that are supported by the frame 14 in a manner described below. As shown in FIG. 3, a bearing 192 supports each trunnion 180 for pivotal movement relative to the respective bearing block 184 or 188. The top platen 172 is pivoted relative to the bearing blocks 184 and 188 by a rotary actuator 196 mounted on the right bearing block 184, as shown in FIGS. 3 and 4. The rotary actuator 196 is preferably a hydraulic actuator drivingly connected to the trunnion 180 (see FIG. 3) by a spline arrangement 200. Counterclockwise movement (as seen in FIG. 2) of the top platen 172 relative to the bearing block 184 is limited by projections or stops 204 and 206 on the platen 172 and by a hydraulic assembly 208 (partially shown) supported by the bearing block 184. The assembly 208 includes a piston rod 212. The stop 204 engages the rod 212 when the platen 172 is in its first rotary position, and the stop 206 engages the rod 212 when the platen 172 is in its second rotary position. The rod 212 is temporarily retracted to permit the platen 172 to move from the first position to the second position.

The bearing blocks 184 and 188 are supported by the frame 14 for vertical movement relative thereto so that the top platen 172 is movable relative to the frame 14 between its upper and lower positions. Preferably, as best shown in FIGS. 2–4, an upper linear actuator 216 is supported by the frame 14 and moves the right bearing block 184 between upper and lower positions, and an upper linear actuator 220 is supported by the frame 14 and moves the left bearing block 188 between upper and lower positions. In the preferred embodiment of the invention, each of the linear actuators 216 and 220 is a ball screw arrangement. Each ball screw arrangement includes (see FIG. 3) a ball screw 224 rotatably supported at its upper and lower ends by frame cross members 22, and a ball screw nut 228 which is fixed to the respective bearing block 184 or 188 and which engages the ball screw 224 such that rotation of the ball screw 224 causes vertical movement of the ball screw nut 228 and thereby the bearing block in a known manner. The ball screws 224 are rotated synchronously (so that the bearing blocks 184 and 188 move up and down together) by a drive mechanism 232 (FIGS. 1 and 2). The drive mechanism 232 includes a servo motor 236 which is supported by a frame cross member 22 and which has an output shaft 240 having thereon upper and lower drive pulleys 244 and 248. A driven pulley 254 is fixed to the upper end of the right ball screw 224, and a driven pulley 258 is fixed to the upper end of the left ball screw 224. A drive belt 264 connects the drive pulley 244 to the driven pulley 254, and a drive belt 268 connects the drive pulley 248 to the driven pulley 258. As a result, rotation of the motor output shaft 240 causes synchronous rotation of the ball screws 224. The motor 236 is controlled by (see FIG. 2) upper and lower limit switches 272 and 276, respectively, which signal the motor 236 when the platen 172 is in its upper and lower positions, respectively. The switches 272 and 276 are supported by a bracket 280 mounted on the frame 14. The switches 272 and 276 are proximity switches that sense a rod (not shown) extending from one of the bearing blocks 184 and 188.

The top platen 172 has opposed first and second sides 284 and 288 (upper and lower sides in FIG. 1) each adapted to support one or more top fixtures 292 (a top fixture 292 is shown only on the lower side 288 in FIG. 1) which are in turn adapted to support respective second or top pattern pieces 296. In the illustrated construction, a single pattern piece 296 is shown. The side 284 of the top platen 172 faces upwardly when the top platen 172 is in its first rotary position, and the side 288 of the top platen 172 faces upwardly when the top platen 172 is in its second rotary position. The top pattern pieces 296 are preferably secured to the fixtures 292 in the same manner as the bottom pattern pieces 168 are secured to the fixtures 164.

Figure 9:
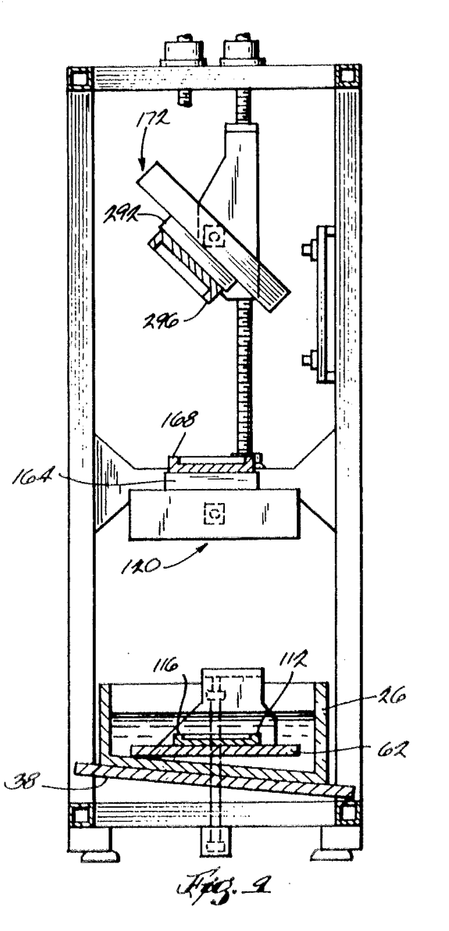
FIG. 9 shows the apparatus with the top platen in its upper and tilted positions, with the center platen in its first rotary position, and with the glue platen in its lower position.
Figure 10:
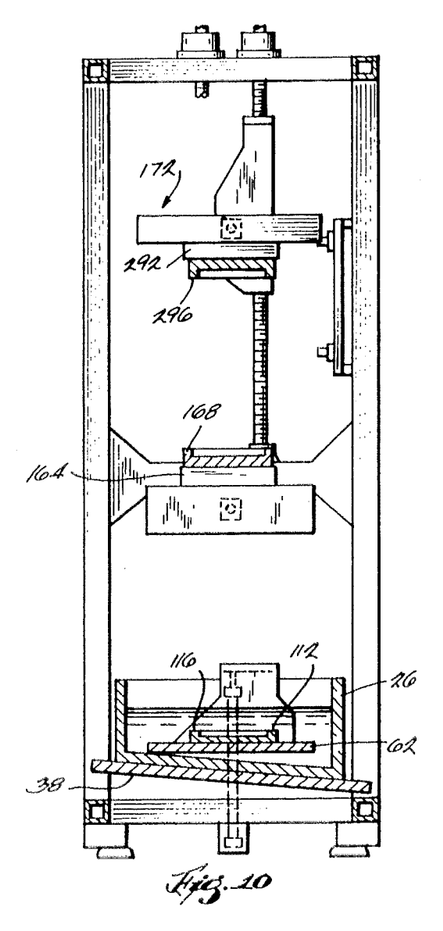
FIG. 10 shows the top platen moved to its first rotary position.
Figure 11:
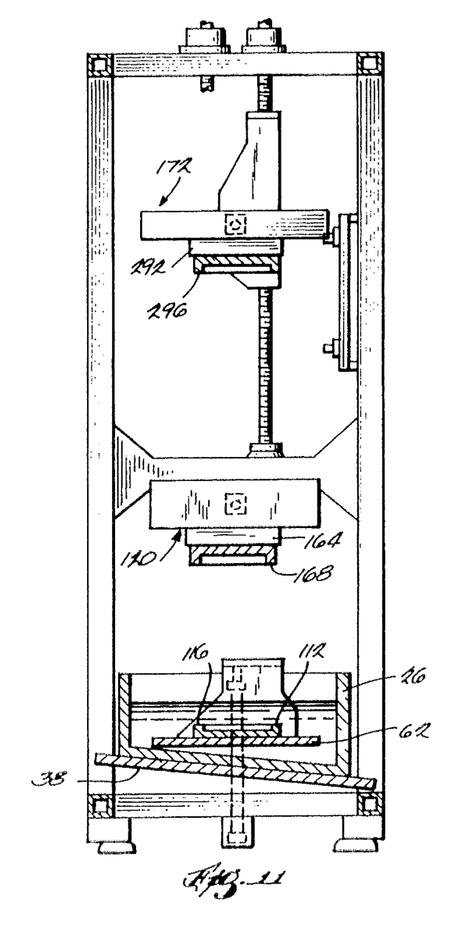
FIG. 11 shows the center platen moved to its second rotary position.
Figure 12:
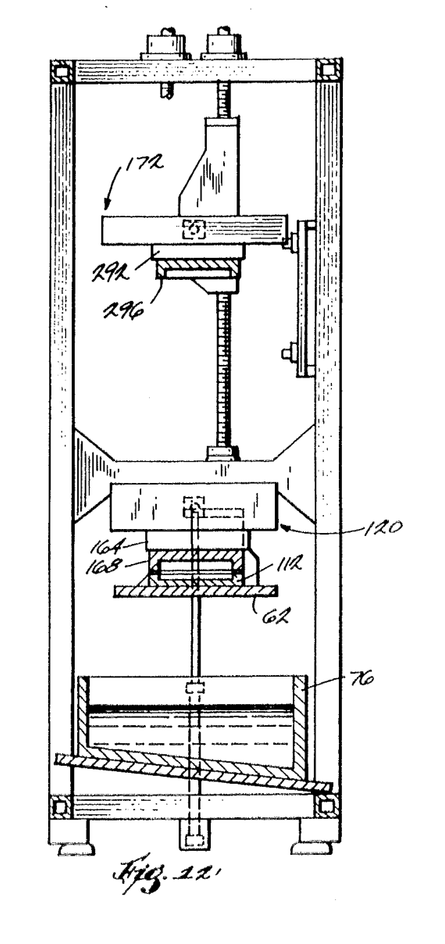
FIG. 12 shows the glue platen moved to its upper position.
Figure 13:
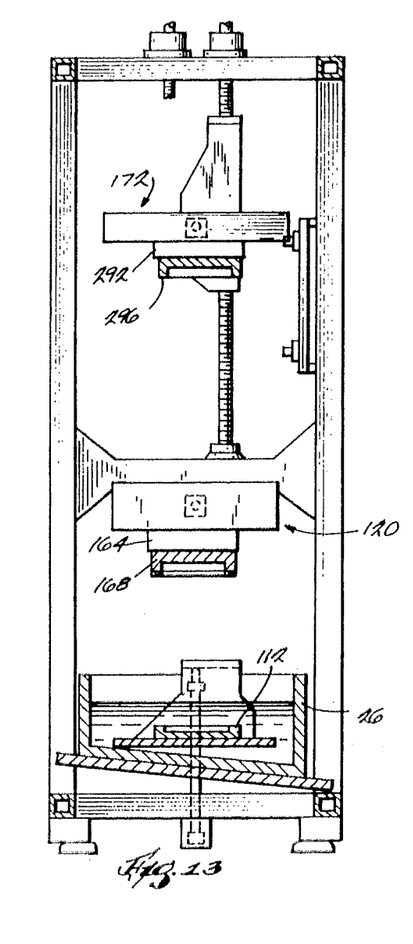
FIG. 13 is a view similar to FIG. 12 shows the glue platen returned to its lower position.
Figure 14:
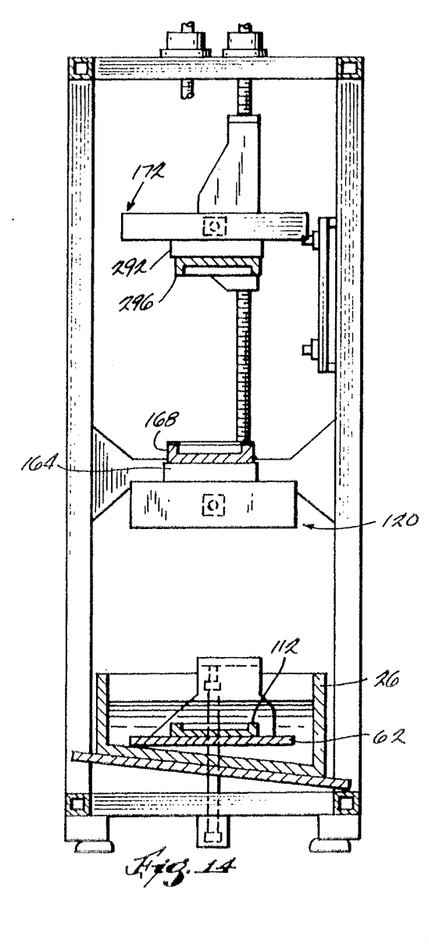
FIG. 14 shows the center platen returned to its first rotary position.
Figure 15:
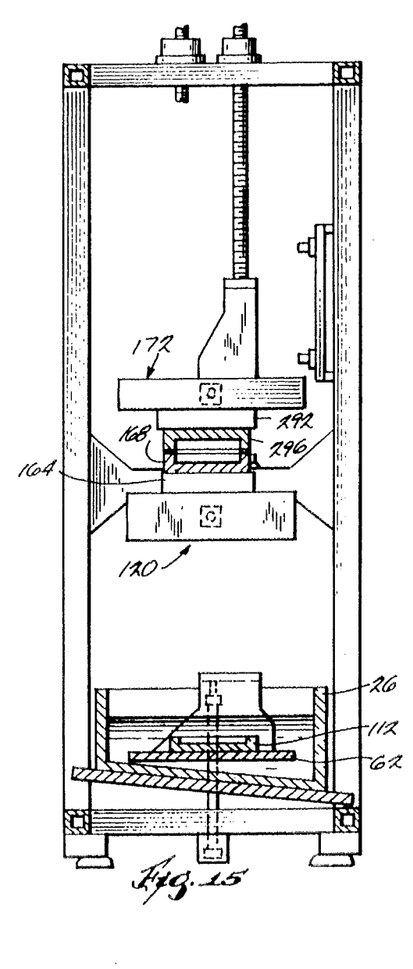
FIG. 15 shows the top platen moved to its lower position.
Figure 16:
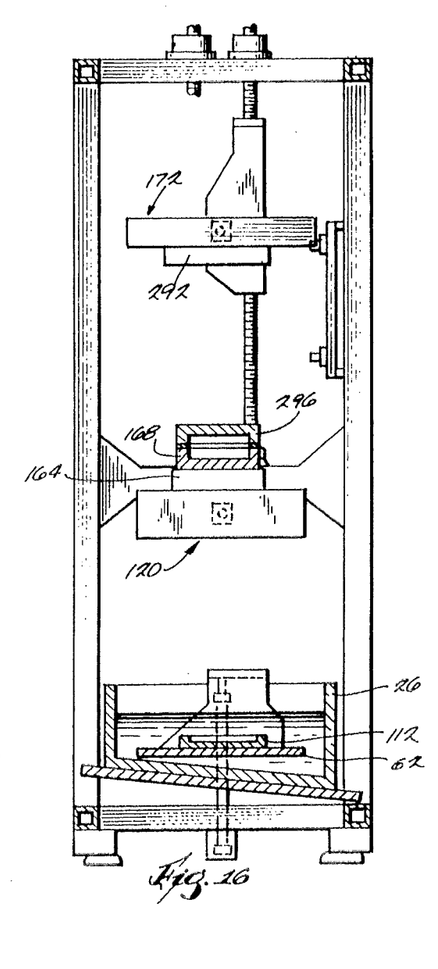
FIG. 16 shows the upper pattern piece released from its fixture and the top platen returned to its upper position.

Operation of the apparatus 10 is illustrated in FIGS. 9–16. Referring to FIG. 9, the top platen 172 is in its upper position and in a tilted position between the first and second rotary positions so as to facilitate location of the top pattern piece 296 on the top fixture 292. The center platen 120 is in its first rotary position. At this point the operator places the top pattern piece 296 on the top fixture 292 and places the bottom pattern piece 168 on the bottom fixture 164. Next, the top platen 172 is pivoted to its first rotary position, as shown in FIG. 10, and the center platen 120 is pivoted to its second rotary position, as shown in FIG. 11. The glue platen 62 is then moved upwardly, as shown in FIG. 12, so that the glue applying surface 116 contacts the bottom pattern piece 168 and applies glue thereto. The glue platen 62 then returns to its lower position, as shown in FIG. 13, and the center platen 120 is pivoted to its first rotary position, as shown in FIG. 14. Next, as shown in FIG. 15, the top platen 172 is moved to its lower position so that the top pattern piece 296 is moved into gluing contact with the bottom pattern piece 168. The pattern pieces are then released from their fixtures (by turning off the vacuum) and the top platen 172 is returned to its upper position, as shown in FIG. 16. The top pattern piece 296 remains on the center platen 120 with the bottom pattern piece 168, and the glued-together pattern pieces 168 and 296 are removed by the operator.

As mentioned above, fixtures can also be secured to the opposite sides of the top and center platens 172 and 120 so that pattern pieces can be located on the both sides of the platens. The additional fixtures can be identical to the fixtures on the opposite sides of the platens, in which case utilizing both sides of the platens could reduce the cycle time of the apparatus 10. Alternatively, the fixtures on the opposite sides of the platens can be different fixtures. This would reduce the amount of time necessary to convert the apparatus 10 from one set of fixtures to another.

In order to provide access to the heating mechanisms 58 and facilitate servicing thereof, the glue tank 26 is selectively connectable to the glue platen 62 such that movement of the glue platen 62 from the lower position to the upper position causes upward movement of the glue tank 26. In the preferred embodiment of the invention, bolts 300 (shown in phantom in FIG. 8) can be inserted through apertures in the glue platen 62 and threaded into the glue tank 26 to secure the glue tank 26 to the glue platen 62. Upward movement of the glue platen 62 then raises the glue tank 26 above the plate.

Figure 17:
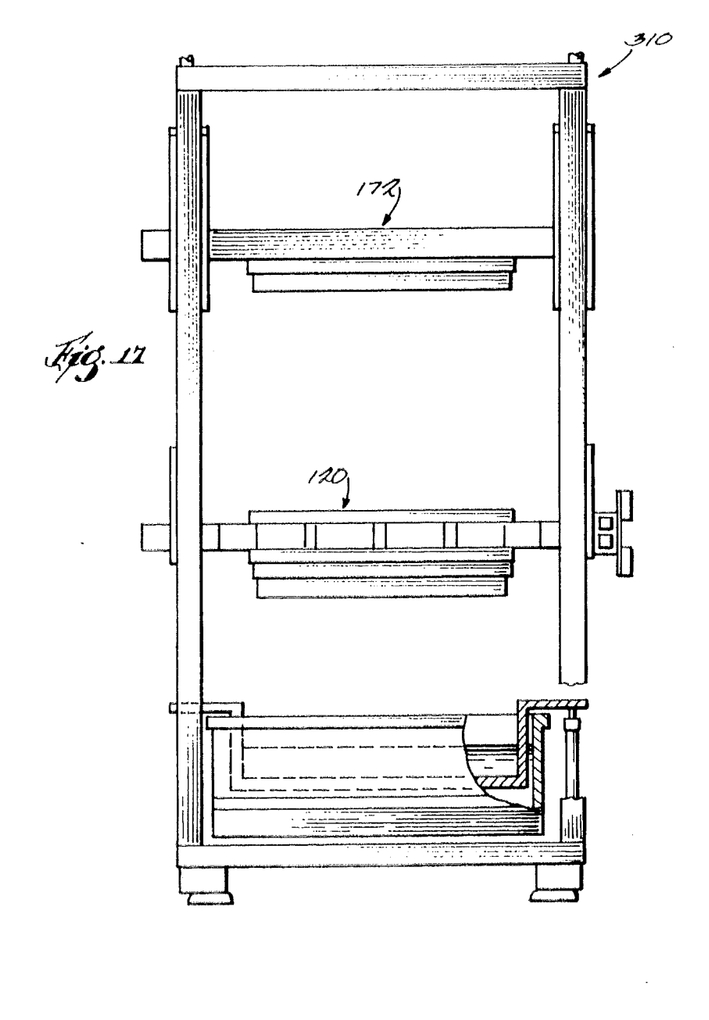
FIG. 17 is a front elevational view, partially broken away, of an apparatus that is an alternative embodiment of the invention.
Figure 18:
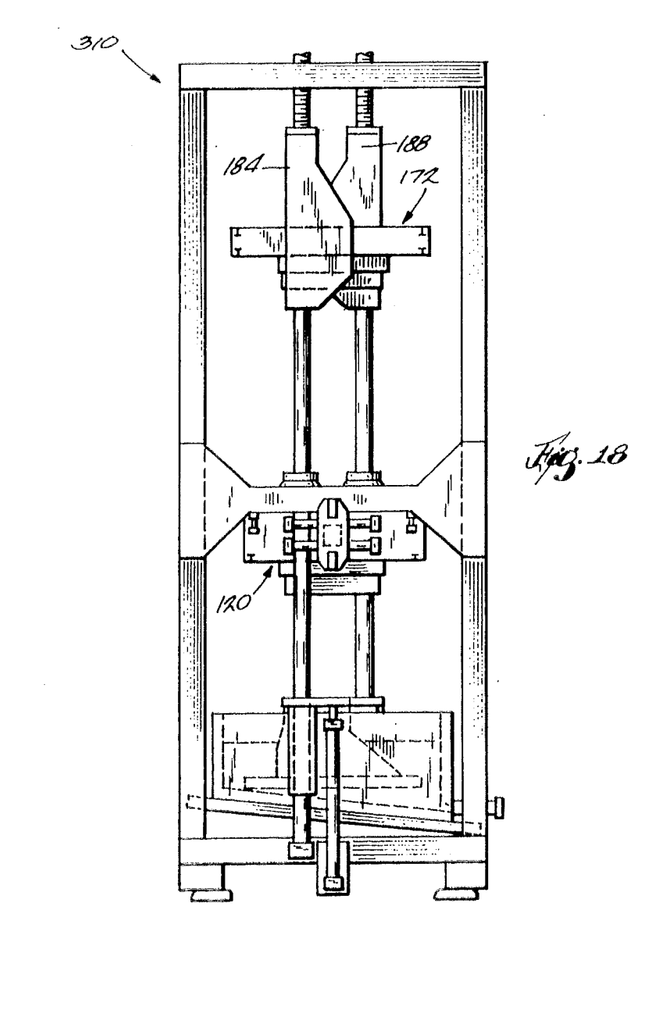
FIG. 18 is a right side elevational view of the apparatus shown in FIG. 17.

An apparatus 310 which is an alternative embodiment of the invention is illustrated in FIGS. 17 and 18. Except as described below, the apparatus 310 is identical to the apparatus 10, and common elements have been given the same reference numerals.

In the apparatus 310, the top platen 172 is not pivotable. Instead, the top platen 172 only moves vertically. The top platen 172 is therefore rigidly fixed to the bearing blocks 184 and 188, and the apparatus 310 does not have a rotary actuator connected to the top platen 172. Operation of the apparatus 310 is the same as described above with respect to the apparatus 10 except that pattern pieces cannot be fixed to both sides of the top platen 172, and the top platen 172 cannot be tilted to facilitate location of pattern pieces thereon. Various features of the invention are set forth in the following claims.

We claim:

1. An apparatus for applying glue to a piece of a foam pattern to be used in a lost foam casting process, said apparatus comprising a frame, a glue tank adapted to contain glue, a heating mechanism located beneath said glue tank, a pattern adapted to surface a pattern piece, and a glue print plate supported by said frame for vertical movement relative thereto, said glue print plate having an upwardly facing glue applying surface, and said glue print plate being movable relative to said frame between a lower position wherein the glue applying surface of said glue print plate is submerged in the glue in said glue tank, and an upper position wherein the glue applying surface of said glue print plate is above the glue in said glue tank and wherein the glue thereon is applied to the pattern piece supported by said platen, a connector for selectively connecting said glue plate and said glue tank such that movement of said glue plate from said lower position to said upper position causes upward movement of said glue tank to provide access to said heating mechanism.

2. An apparatus as set claim 18 wherein said platen is located above said glue plate and is supported by said frame for pivotal movement relative thereto about a generally horizontal axis and between a first rotary position wherein the pattern piece faces upwardly and a second rotary position wherein the pattern piece faces downwardly and wherein the glue print plate applies the glue supplied to the pattern piece when said glue plate is in said upper position, and a top platen located above said first mentioned platen, adapted to support a second pattern piece, and supported by said frame for vertical movement relative thereto between upper and lower positions, the second pattern piece being spaced above the first mentioned pattern piece when said top platen is in said upper position and said first mentioned platen is in said first rotary position, and the second pattern piece being moved into gluing contact with the first mentioned pattern piece when said first mentioned platen is in said first rotary position and said top platen is moved from said upper position to said lower position.

3. An apparatus as set forth in claim 1 and further comprising a linear actuator which is supported by said frame and which moves said glue plate between said upper and lower positions.

4. An apparatus for gluing together first and second pieces of a foam pattern to be used in a lost foam casting process, said apparatus comprising
a frame,
a glue tank adapted to contain glue,
a glue platen supported by said frame for vertical movement relative thereto, said glue platen being adapted to support a glue print plate having an upwardly facing glue applying surface, and said glue platen being movable relative to said frame between a lower position wherein the glue applying surface of the glue print plate is submerged in the glue in said glue tank, and an upper position wherein the glue applying surface of the glue print plate is above the glue in said glue tank,
a lower linear actuator which is supported by said frame and which moves said glue platen between said upper and lower positions,
a center platen located above said glue platen, said center platen being adapted to support a bottom fixture which is in turn adapted to support the first pattern piece, and said center platen being supported by said frame for pivotal movement relative thereto about a generally horizontal axis and between a first rotary position wherein the first pattern piece faces upwardly and a second rotary position wherein the first pattern piece faces downwardly and the glue print plate applies glue to the first pattern piece when said glue platen moves from said lower position to said upper position,
a rotary actuator which is supported by said frame and which moves said center platen between said first and second rotary positions,
a top platen located above said center platen, said top platen being adapted to support a top fixture which is in turn adapted to support the second pattern piece, and said top platen being supported by said frame for vertical movement relative thereto between upper and lower positions, the second pattern piece being spaced above the first pattern piece when said top platen is in said upper position and said center platen is in said first rotary position, and the second pattern piece being moved into gluing contact with the first pattern piece when said center platen is in said first rotary position and said top platen is moved from said upper position to said lower position, and
an upper linear actuator which is supported by said frame and which moves said top platen between said upper and lower positions.

5. An apparatus as set forth in claim 4 wherein said top platen is also supported by said frame for pivotal movement relative thereto about a generally horizontal axis so as to facilitate location of the second pattern piece on the top fixture.

6. An apparatus as set forth in claim 4 wherein said top platen has opposed first and second sides each adapted to support a top fixture, wherein said top platen is also supported by said frame for pivotal movement relative thereto about a generally horizontal axis and between a first rotary position wherein said first side faces upwardly and a second rotary position wherein said second side faces upwardly, and wherein said apparatus also comprises a rotary actuator which is supported by said frame and which moves said top platen between said first and second rotary positions.

7. An apparatus as set forth in claim 6 wherein said center platen has opposed first and second sides each adapted to support a bottom fixture, wherein said first side of said center platen faces upwardly when said center platen is in said first rotary position, and wherein said second side of said center platen faces upwardly when said center platen is in said second rotary position.

8. An apparatus as set forth in claim 4 and further comprising a heating mechanism located beneath said glue tank, and wherein said glue tank is selectively connectable to said glue platen such that movement of said glue platen from said lower position to said upper position causes upward movement of said glue tank to provide access to said heating mechanism.

9. An apparatus as set forth in claim 4 wherein each of said glue platen, said center platen and said top platen is constrained to one type of movement.

10. An apparatus as set forth in claim 4 wherein said upper linear actuator includes a ball screw arrangement.

11. An apparatus as set forth in claim 10 wherein said top platen has horizontally spaced first and second ends, and wherein said ball screw arrangement includes a first ball screw which is rotatably supported by said frame and which extends adjacent said first end of said top platen, a first ball screw nut which engages said first ball screw and which is fixed relative to said first end of said top platen, a second ball screw which is rotatably supported by said frame and which extends adjacent said second end of said top platen, and a second ball screw nut which engages said second ball screw and which is fixed relative to said second end of said top platen.

12. An apparatus for gluing together first and second pieces of a foam pattern to be used in a lost foam casting process, said apparatus comprising
 a frame,
 a glue tank adapted to contain glue,
 a glue print plate supported by said frame for vertical movement relative thereto, said glue print plate having an upwardly facing glue applying surface, and said glue print plate being movable relative to said frame between a lower position wherein the glue applying surface of said glue print plate is submerged in the glue in said glue tank, and an upper position wherein the glue applying surface of said glue print plate is above the glue in said glue tank,
 a center platen located above said glue platen, said center platen being adapted to support the first pattern piece, and said center platen being supported by said frame for pivotal movement relative thereto about a generally horizontal axis and between a first rotary position wherein the first pattern piece faces upwardly and a second rotary position wherein the first pattern piece faces downwardly and said glue print plate applies glue to the first pattern piece when said glue plate moves from said lower position to said upper position, and
 a top platen located above said center platen, said top platen being adapted to support the second pattern piece, and said top platen being supported by said frame for vertical movement relative thereto between upper and lower positions, the second pattern piece being spaced above the first pattern piece when said top platen is in said upper position and said center platen is in said first rotary position, and the second pattern piece being moved into gluing contact with the first pattern piece when said center platen is in said first rotary position and said top platen is moved from said upper position to said lower position.

13. An apparatus as set forth in claim 12 wherein said top platen is also supported by said frame for pivotal movement relative thereto about a generally horizontal axis so as to facilitate location of the second pattern piece on said top platen.

14. An apparatus as set forth in claim 12 wherein said top platen has opposed first and second sides each adapted to support a pattern piece, and wherein said top platen is also supported by said frame for pivotal movement relative thereto about a generally horizontal axis and between a first rotary position wherein said first side faces upwardly and a second rotary position wherein said second side faces upwardly.

15. An apparatus as set forth in claim 14 wherein said center platen has opposed first and second sides each adapted to support a pattern piece, wherein said first side of said center platen faces upwardly when said center platen is in said first rotary position, and wherein said second side of said center platen faces upwardly when said center platen is in said second rotary position.

16. An apparatus as set forth in claim 12 and further comprising a heating mechanism located beneath said glue tank, and wherein said glue tank is selectively connectable to said glue plate such that movement of said glue plate from said lower position to said upper position causes upward movement of said glue tank to provide access to said heating mechanism.

17. An apparatus as set forth in claim 12 wherein each of said glue plate, said center platen and said top platen is constrained to one type of movement.

18. An apparatus as set forth in claim 12 and further comprising a rotary actuator which is supported by said frame and which moves said center platen between said first and second rotary positions, a lower linear actuator which is supported by said frame and which moves said glue plate between said upper and lower positions, and an upper linear actuator which is supported by said frame and which moves said top platen between said upper and lower positions.

19. An apparatus as set forth in claim 18 wherein said upper linear actuator includes a ball screw arrangement.

20. An apparatus as set forth in claim 19 wherein said top platen has horizontally spaced first and second ends, and wherein said ball screw arrangement includes a first ball screw which is rotatably supported by said frame and which extends adjacent said first end of said top platen, a first ball screw nut which engages said first ball screw and which is fixed relative to said first end of said top platen, a second ball screw which is rotatably supported by said frame and which extends adjacent said second end of said top platen, and a second ball screw nut which engages said second ball screw and which is fixed relative to said second end of said top platen.

* * * * *